(12) United States Patent
Eng et al.

(10) Patent No.: US 10,248,371 B1
(45) Date of Patent: Apr. 2, 2019

(54) PRINT JOB ORDER OPTIMIZATION MECHANISM

(71) Applicants: Katie Eng, Boulder, CO (US); Stephen Mandry, Longmont, CO (US); David Ward, Broomfield, CO (US)

(72) Inventors: Katie Eng, Boulder, CO (US); Stephen Mandry, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/003,193

(22) Filed: Jun. 8, 2018

(51) Int. Cl.
 G06F 3/12  (2006.01)

(52) U.S. Cl.
 CPC .......... G06F 3/1263 (2013.01); G06F 3/1207 (2013.01); G06F 3/1259 (2013.01)

(58) Field of Classification Search
 CPC ..... G06F 3/1263; G06F 3/1207; G06F 3/1259
 USPC ....................................................... 358/1.15
 See application file for complete search history.

(56) References Cited

U.S. PATENT DOCUMENTS

| | | | |
|---|---|---|---|
| 7,624,981 B2 | 12/2009 | Biegelsen et al. | |
| 7,706,737 B2 | 4/2010 | Lang | |
| 8,322,720 B2 | 12/2012 | DeGruchy | |
| 8,693,012 B2 | 4/2014 | Mandel et al. | |
| 8,767,221 B2 | 7/2014 | Mochizuki et al. | |
| 2001/0015812 A1* | 8/2001 | Sugaya | G06F 3/1204 358/1.1 |
| 2005/0065623 A1* | 3/2005 | Miyoshi | G06T 9/20 700/90 |
| 2007/0289461 A1 | 12/2007 | Bernard et al. | |
| 2012/0044535 A1* | 2/2012 | Samii | B41J 11/009 358/1.15 |
| 2012/0311586 A1* | 12/2012 | Inagaki | G06F 9/4881 718/100 |
| 2012/0320424 A1* | 12/2012 | Hosoda | G03G 15/234 358/1.18 |
| 2015/0215479 A1* | 7/2015 | Yasinover | H04N 1/387 358/1.2 |

FOREIGN PATENT DOCUMENTS

JP  201402894 A  2/2014

OTHER PUBLICATIONS

Kothari, S., Peck, T., Zeng. J. et al. (2015). Simulation as a cloud service for short-run high throughput industrial print production using a service broker architecture. Simulation modelling practice and theory, 58, pp. 115-139.

* cited by examiner

*Primary Examiner* — Allen H Nguyen
(74) *Attorney, Agent, or Firm* — Jaffery Watson Mendonsa & Hamilton LLC (57) ABSTRACT

A printing system is disclosed. The printing system includes at least one memory device to store optimization logic and one or more processors, coupled to the at least one memory device, to execute the optimization logic to receive a print job batch including a plurality of print jobs each having starting and ending media length pair values and generate a revised print job order list having a sequence for printing the plurality of print jobs to reduce a number of media length transitions based on a matching of the starting and ending media length pair values of the plurality of print jobs.

20 Claims, 14 Drawing Sheets

| Job 100<br>Start: 297mm<br>End: 210mm | Job 104<br>Start: 420mm<br>End: 420mm | Job 108<br>Start: 248mm<br>End: 248mm | Job 112<br>Start: 297mm<br>End: 11in | Job 116<br>Start: 8.5in<br>End: 8.5in |
|---|---|---|---|---|
| Job 101<br>Start: 8.5in<br>End: 297mm | Job 105<br>Start: 210mm<br>End: 420mm | Job 109<br>Start: 420mm<br>End: 11in | Job 113<br>Start: 210mm<br>End: 210mm | Job 117<br>Start: 17in<br>End: 297mm |
| Job 102<br>Start: 297mm<br>End: 14in | Job 106<br>Start: 248mm<br>End: 8.5in | Job 110<br>Start: 11in<br>End: 297mm | Job 114<br>Start: 210mm<br>End: 210mm | Job 118<br>Start: 148mm<br>End: 357mm |
| Job 103<br>Start: 14in<br>End: 13in | Job 107<br>Start: 420mm<br>End: 420mm | Job 111<br>Start: 297mm<br>End: 210mm | Job 115<br>Start: 297mm<br>End: 297mm | Job 119<br>Start: 357mm<br>End: 148mm |

PRINT JOB ORDER OPTIMIZATION MECHANISM

FIELD OF THE INVENTION

The invention relates to the field of high speed production printing, and in particular, to optimization of print job processing for high speed production printing.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each printhead assembly may include one or more printheads.

Variable paper length support has recently been added to continuous-forms printers to provide for print media (e.g., paper) savings and workflow flexibility for mixed-length print jobs. However, current print engines may include an interface that is optimized for fixed length printing. Thus, a run length encoding of the run may need to be provided to the print engine in advance as an indication of a sheet length, and the number of sheets for that sheet length, for all sheets to be printed for a particular run of one or more print jobs. The run length encoding is trivial when all of the sheets are of fixed length (e.g., the engine is informed of the fixed length and the maximum number sheets regardless of the number of real sheets that will be printed).

A set of variable paper length print jobs may have many sheet length transitions, which is determined from a list of held or stored print jobs. Various continuous forms print engines impose a limit on the number of sheet length transitions (e.g., 32) that may occur without the print engine forcing a cycle down. For instance, a print job that has 8.5×11 for n−1 sheets and 8.5×14 for the nth sheet, has 1 sheet transition. As a result, the jobs in the held list may not be ordered in a manner that minimizes or avoids the forced cycle downs by the engine.

Accordingly, a mechanism to optimize the printing order of print jobs in a variable paper length run is desired.

SUMMARY

In one embodiment, a method is disclosed including receiving a print job batch including a plurality of print jobs each having starting and ending media length pair values and generating a revised print job order list having a sequence for printing the plurality of print jobs to reduce a number of media length transitions based on a matching of the starting and ending media length pair values of the plurality of print jobs.

BRIEF DESCRIPTION OF THE DRAWINGS

A better understanding of the present invention can be obtained from the following detailed description in conjunction with the following drawings, in which.

DETAILED DESCRIPTION

A mechanism to optimize the order of print jobs in a variable paper length run is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
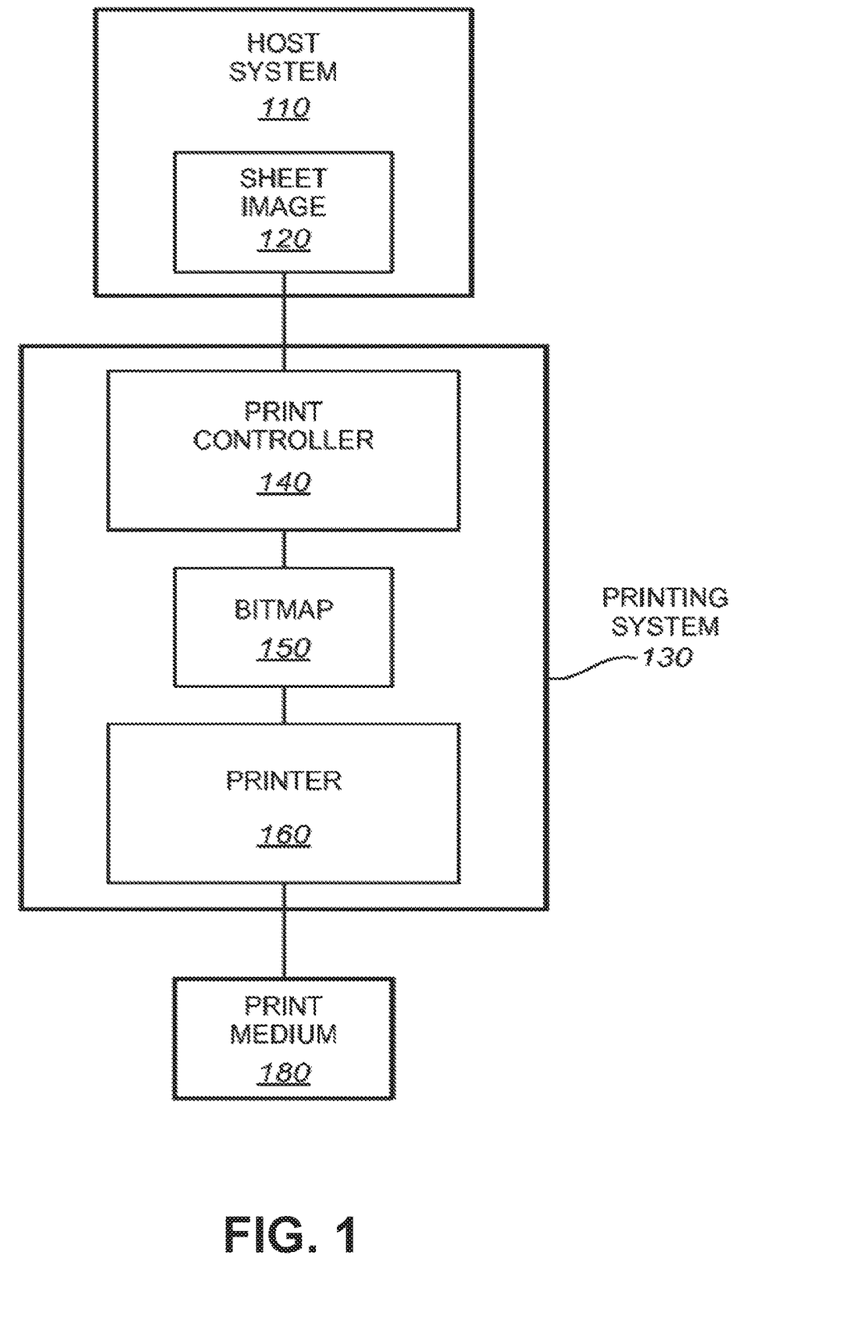
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, textiles or other substrates suitable for printing) via a printer 160. The resulting print medium 180 may be printed in color and/or in any of a number of gray shades, including black and white (e.g., Cyan, Magenta, Yellow, and black, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 that is to be transmitted for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, marking material, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
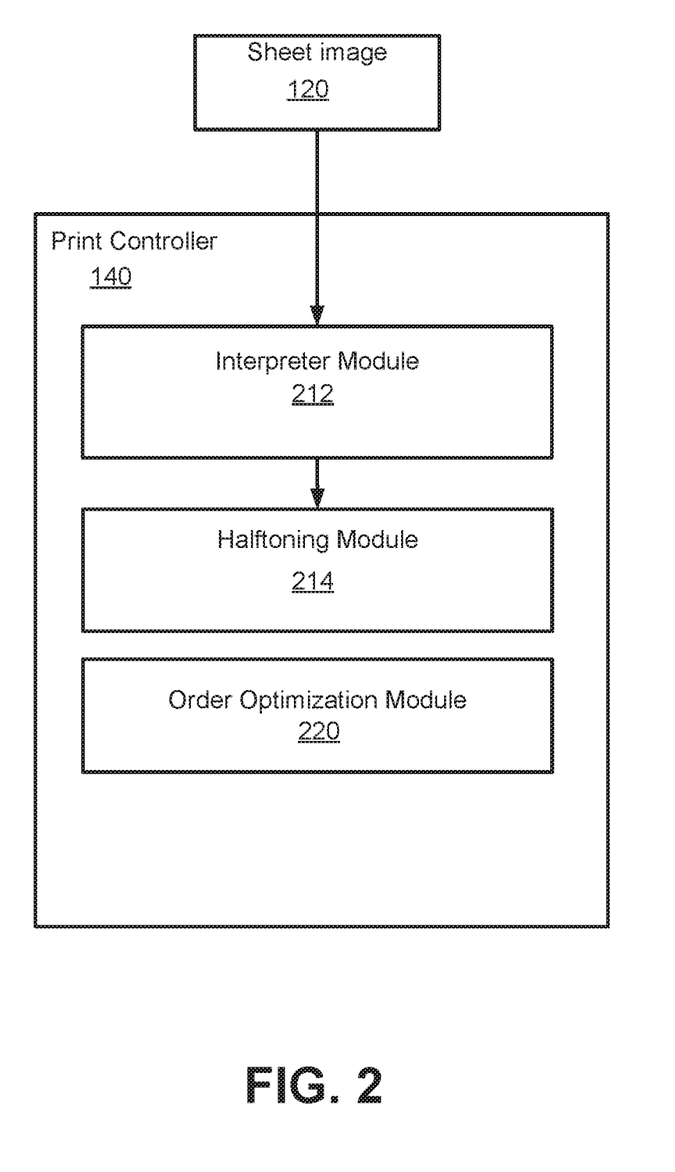
FIG. 2 is a block diagram of one embodiment of a print controller.

FIG. 2 is a block diagram illustrating one embodiment of a print controller 140. The print controller 140 (e.g., DFE or digital front end), in its generalized form, includes interpreter module 212 and halftoning module 214. Interpreter module 212 is operable to interpret, render, rasterize, or otherwise convert images (e.g., raw sheetside images or printer language data such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the entire set of pixels for the image. Interpreter module 212 is operable to interpret or render multiple raw sheetsides concurrently so that the rate of rendering substantially matches the rate of imaging of production print engines. Halftoning module 214 is operable to represent the sheetside bitmaps as halftone patterns of ink. For example, halftoning module 214 may convert the pixels to halftone patterns of CMYK ink for application to the paper.

In a further embodiment, print controller 140 receives a sheet image 120 including a batch of print jobs having variable paper lengths and/or a print job list. In one embodiment, the batch of print jobs may include a print job list that provides an order in which the jobs in the batch are to be printed. Further, the print job list may also include print job prioritization data indicating a priority in which the plurality of jobs are to be printed. In some embodiments, the print job list may also include a start media page size and an end media page size length pair value for each print job in the batch and corresponding print job identifiers (ID) for the print jobs. There may be a plurality of different starting and ending media length pair values for a batch of print jobs.

In one embodiment, interpreter module 212 interprets each print job included in the batch and associates a print job identifier (ID) with each print job. In a further embodiment, interpreter module 212 may determine a start media page size and an end media page size length pair value for each print job in the batch, in embodiments in which the information is not included in the print job list, and associates the starting and ending media length pair values with the corresponding print job IDs. In another embodiment, the print job list is generated with the determined start media and end media page size length pair and associated print job identifiers for the print jobs.

According to one embodiment, print controller 140 also includes a print job order optimization module 220 to optimize an order of print jobs in a variable paper length run to reduce a number of media length transitions. In such an embodiment, optimization module 220 receives the print job list and the starting and ending media length pair values for the batch of jobs and generates a revised print job order list, which includes a printing sequence for the print jobs in the batch that reduces the number of media length transitions. In this embodiment, the revised print job order list is based on a matching of the corresponding starting and ending media length pair values of the plurality of print jobs.

In a further embodiment, optimization module 220 generates the revised print job order list via the generation and analysis of a directed graph that provides a representation that indicates a printing order relationship between each of the plurality of print jobs in the print job batch. In one embodiment, the vertices of the directed graph correspond to the print jobs in the batch. Specifically, each vertex in the directed graph corresponds to a starting and ending media length pair value of a print job, while edges between the vertices represent a corresponding sequence for printing the connected print jobs.

Figure 3:
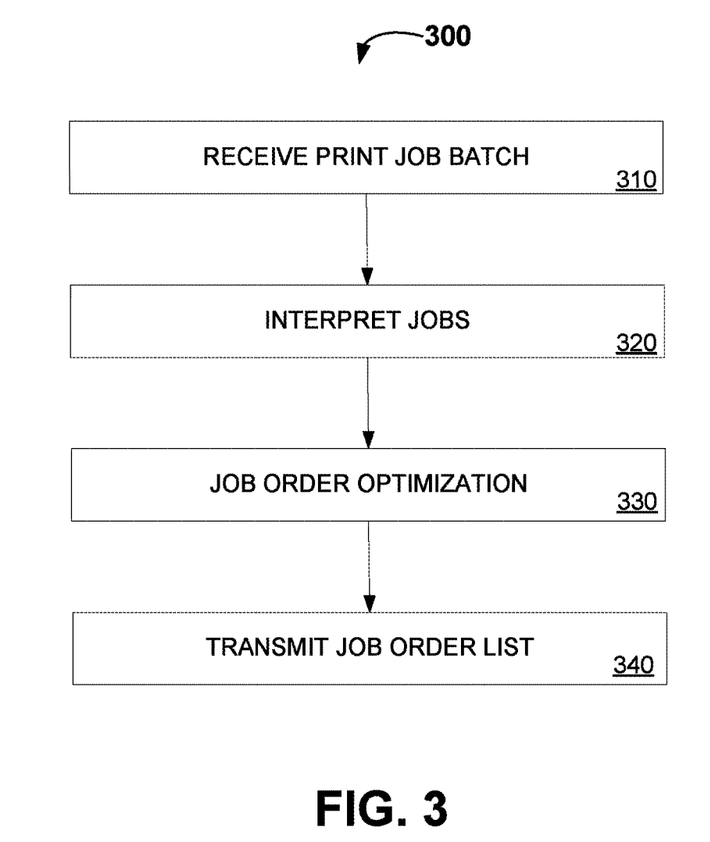
FIG. 3 is a flow diagram illustrating one embodiment of a method for processing a batch of print jobs.

FIG. 3 is a flow diagram illustrating one embodiment of a method 300 for processing a batch of print jobs. Process 300 may be performed by processing logic that may comprise hardware (e.g., circuitry, dedicated logic, programmable logic, etc.), software (such as instructions run on a processing device), or a combination thereof. In one embodiment, process 300 may be performed by print controller 140. The process 300 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1&2 are not discussed or repeated here.

Figure 4:
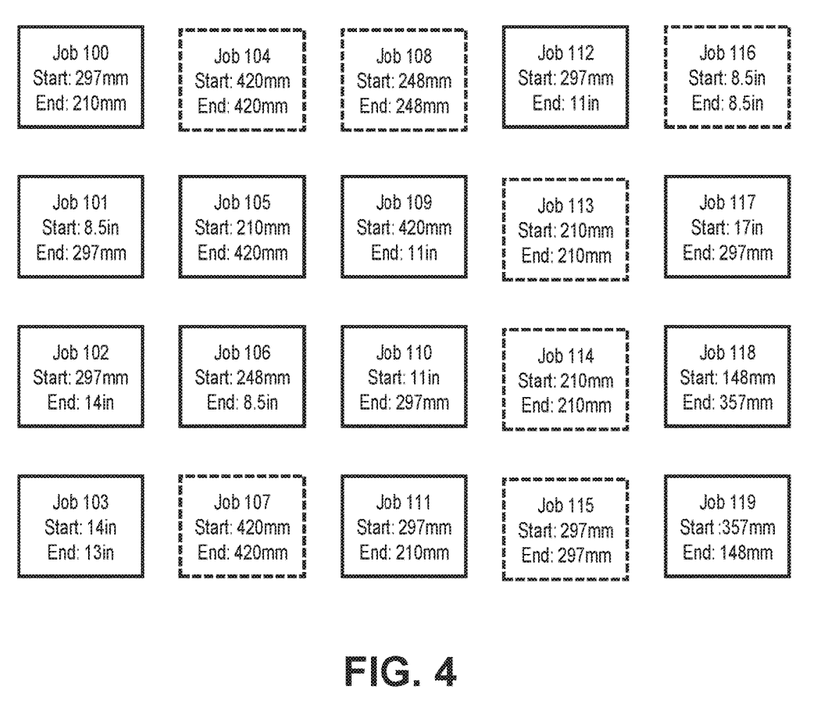
FIG. 4 illustrates one embodiment of unordered print jobs.

Process 300 begins at processing block 310, where a print job batch, and/or a print job list, is received. At processing block 320, the print job batch and/or the print job list may be interpreted to determine starting and ending media length pair values for each job in the batch. In one embodiment, the print job list is generated with an initial order for printing the print jobs. FIG. 4 illustrates one embodiment of unordered print jobs after interpretation. As shown in FIG. 4, each job has an associated Job ID (e.g., Job 100) and starting and ending media length pair values (e.g., in mm). Additionally, the solid boxes represent jobs that have different media for the start and end of the job, while the dashed boxes represent jobs that have the same media for the start and end of the job.

Referring back to FIG. 3, job order optimization is performed on the batch once interpretation has been completed, processing block 330. At processing block 340, the print job order list (e.g., the initial order list or revised list, depending on the result of job order optimization) is transmitted for further processing. In one embodiment, the print job order list is transmitted, along with the print job batch, to printer 160 for printing. However in other embodiments, the print job order list may be transmitted to a display device for display to a user, to printer 160 for processing or to other devices. In some embodiments, the print job order list may include the Job ID and starting and ending media length pair values associated with the print jobs.

Figure 5:
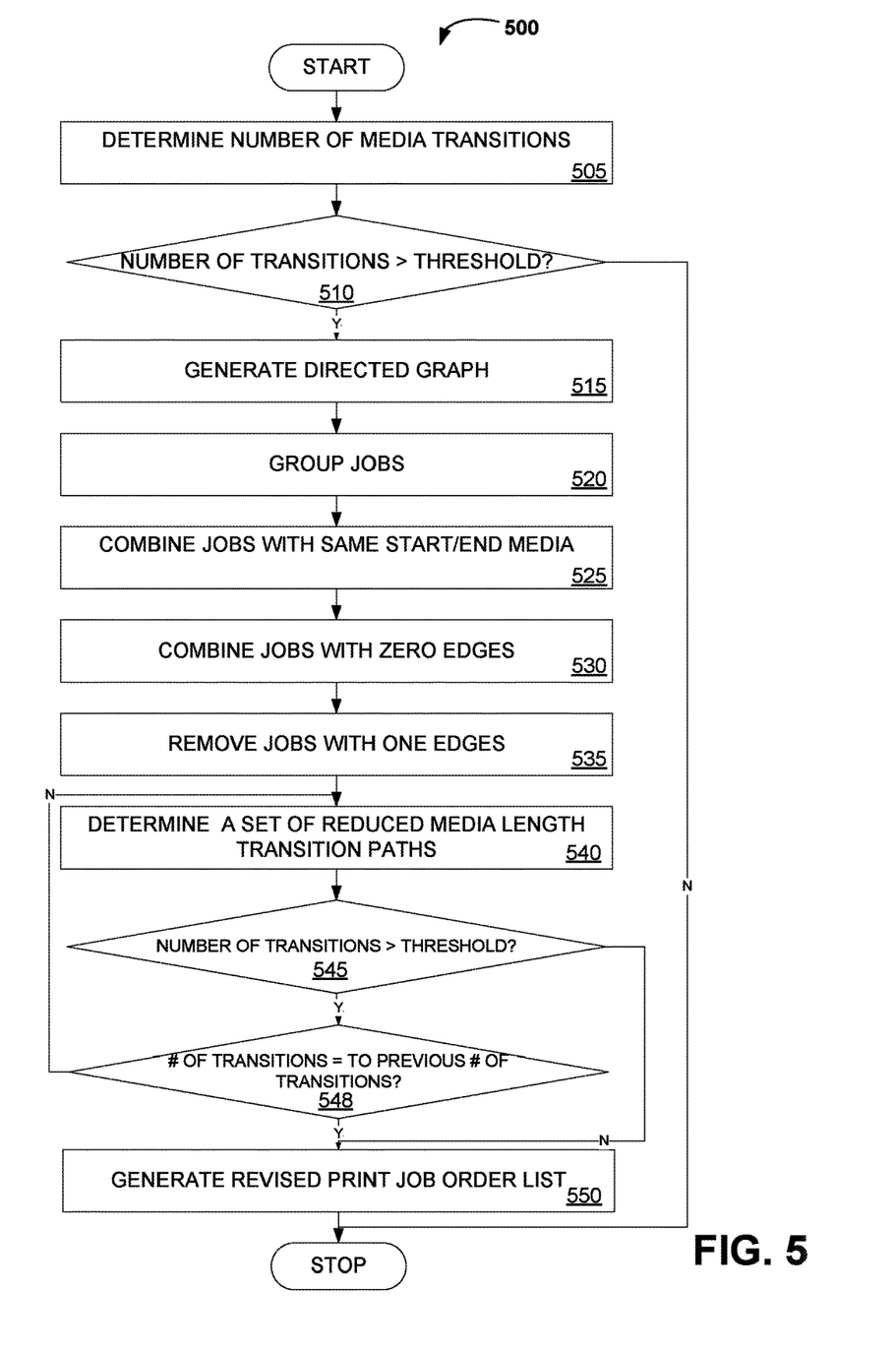
FIG. 5 is a flow diagram illustrating one embodiment of a process for performing print job order optimization.

FIG. 5 is a flow diagram illustrating one embodiment of a method 500 for performing job order optimization on a print job batch. Process 500 may be performed by processing logic that may comprise hardware (e.g., circuitry, dedicated logic, programmable logic, etc.), software (such as instructions run on a processing device), or a combination thereof. In one embodiment, process 500 may be performed by optimization logic 220. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 505, where a number of media transitions is determined based on the print job list. At decision block 510, a determination is made as to whether the number of media transitions in the print job list is greater than a predetermined threshold. In one embodiment, the threshold represents a number of media transitions that are acceptable to efficiently process the jobs in the print job batch for a printing system 130. The process is completed if there is a determination at decision block 510 that the number of media transitions is less than the predetermined threshold, which is due to the number of media transitions in the initial print job list being acceptable.

However if a determination is made at decision block 510 that the number of media transitions is greater than a predetermined threshold, a directed graph is generated for jobs in the print job list, processing block 515, based on the print job list. In one embodiment, the directed graph (or job relation graph) represents all potential orders in which the jobs in the print job list could be printed. In such an embodiment, the graph includes vertices that represent each print job in the print job list, and edges representing media transitions between the print jobs.

Figure 6:
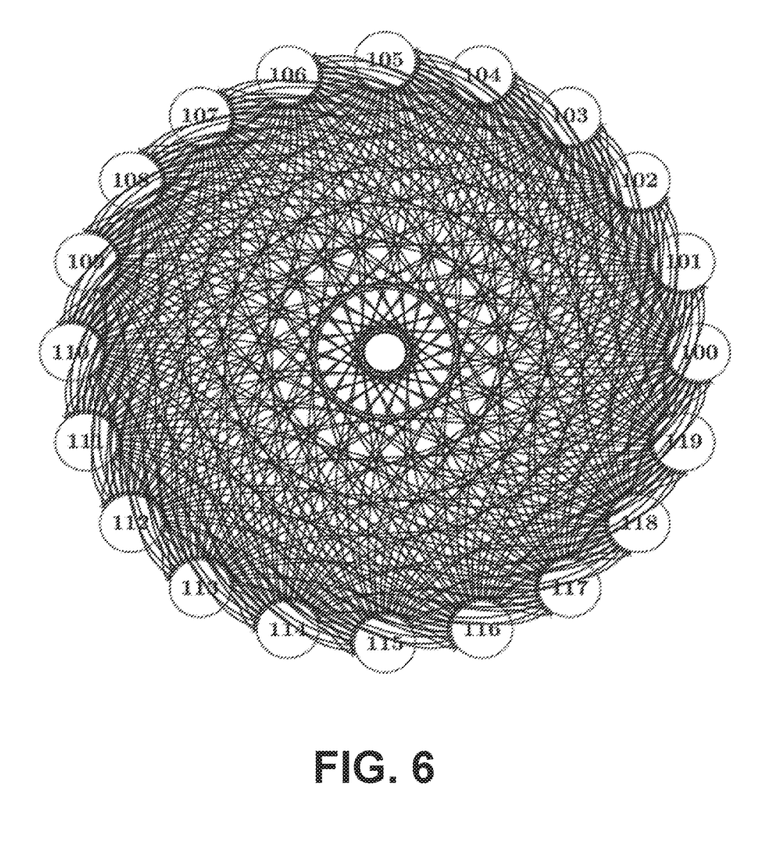
FIG. 6 illustrates an embodiment of an unordered job relation graph.

According to one embodiment, an edge is considered a zero-edge if there is no media transition between two vertices (e.g., a job that has a start media value that matches an end media value of another job), while an edge is considered a one-edge if there is a media transition between two vertices (e.g., a job that has a start media value that does not match an end media value of another job). FIG. 6 illustrates an unordered job relation graph according to one embodiment, where the number of vertices equals 20 and the number of edges equals 20*19 (or 380).

Figure 7A:
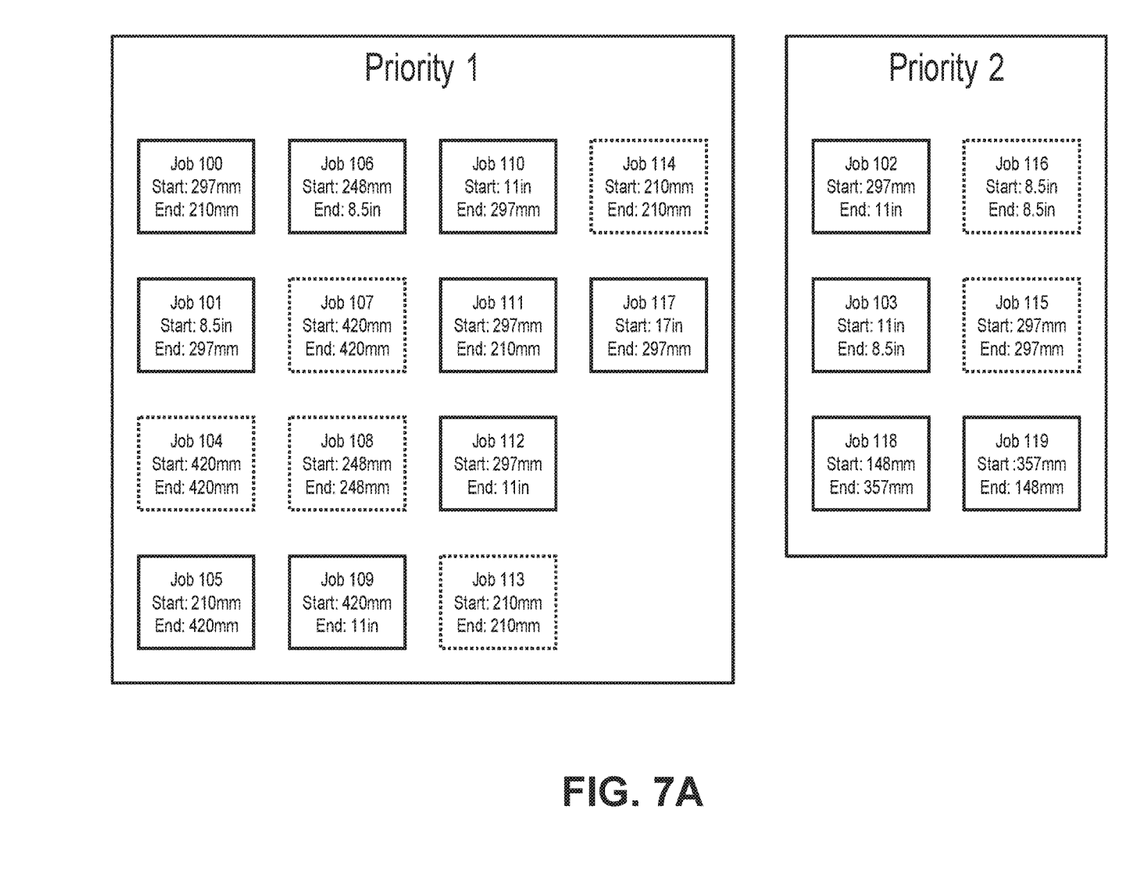
FIGS. 7A-7D illustrate embodiments of ordered print jobs.
Figure 8A:
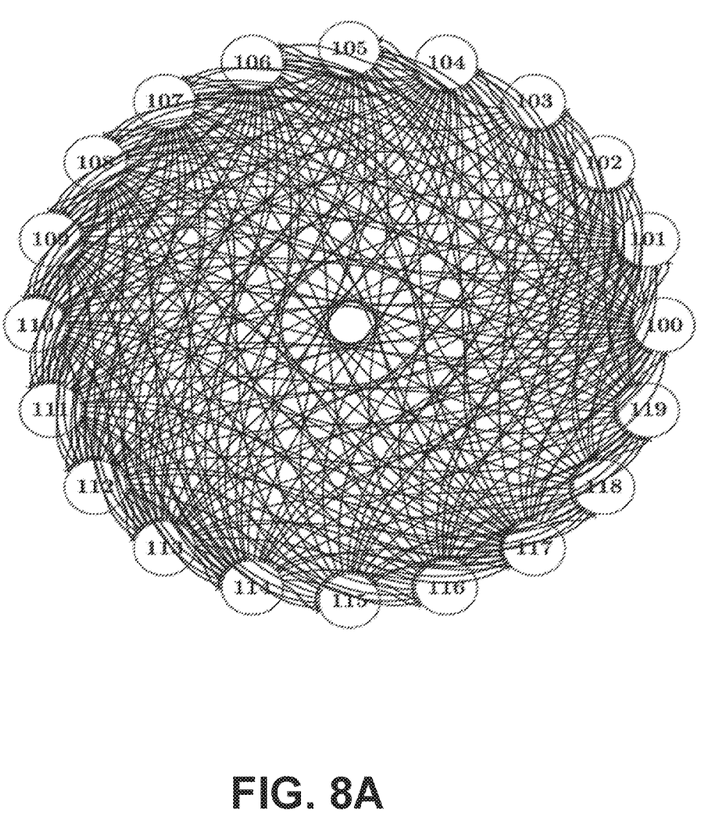
FIGS. 8A-8C illustrate embodiments of job relation graphs for ordered print jobs.

At processing block 520, the vertices (or jobs) are grouped (or sorted) by priority based on the priority data included in the print job list. Once the jobs are sorted, edges (or transitions) are removed that cannot cross the priority boundary. FIG. 7A illustrates one embodiment of the print jobs organized by priority. As shown in FIG. 7A, priority 1 includes 14 jobs, while priority 2 includes 6 jobs. FIG. 8A illustrates one embodiment of an updated job relation graph for the sorted jobs. After sorting, 6 jobs in priority 2 connect to 14 vertices in priority 1. Thus, 84 edges may be removed from the graph after removing these connections, resulting in a total of 296 edges after reduction (or 22% reduction in the number of edges from the initial complete graph).

Figure 7B:
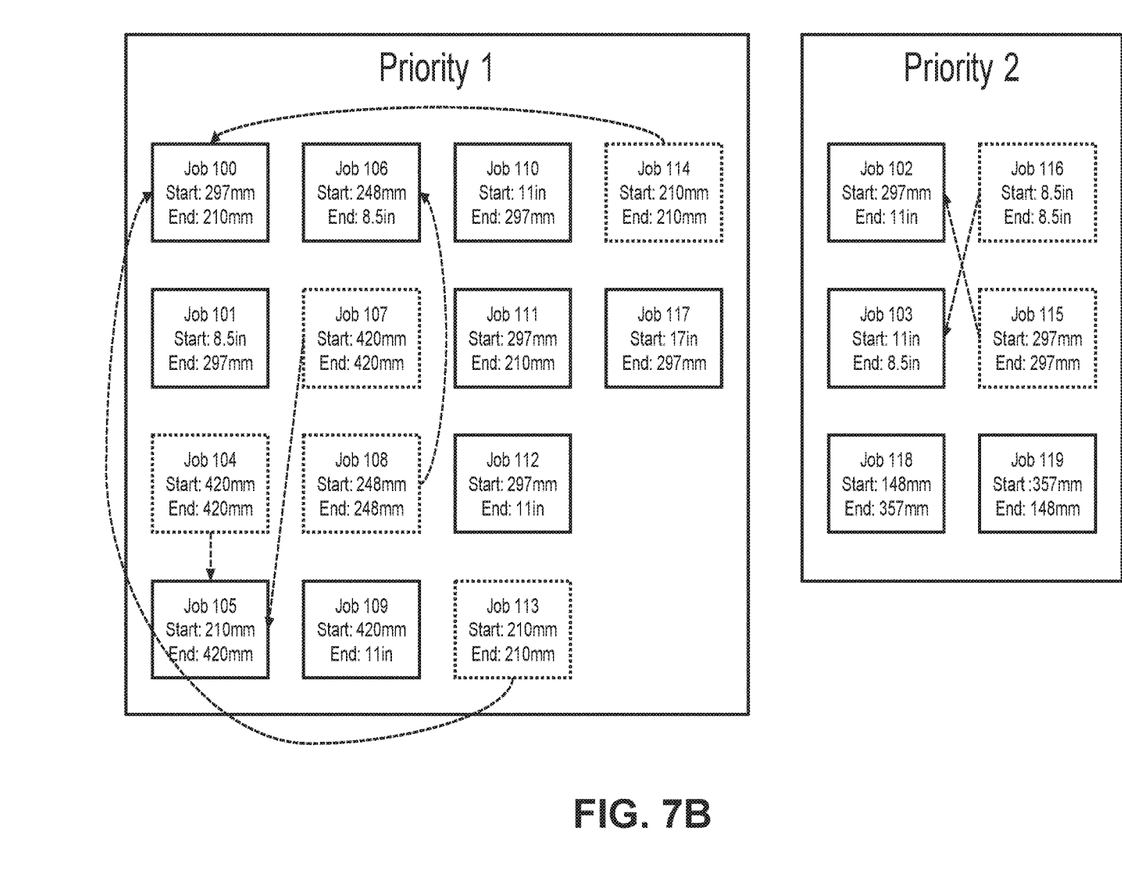
Figure 7C:
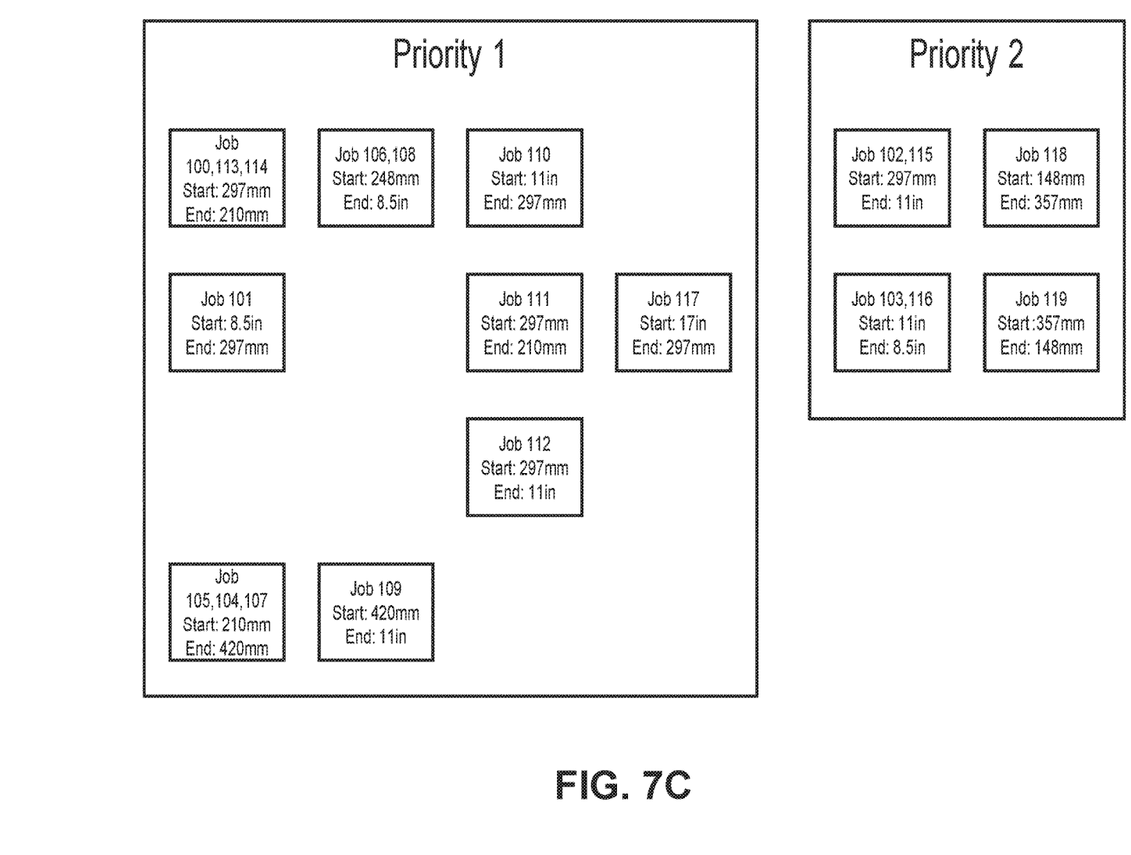
Figure 8B:
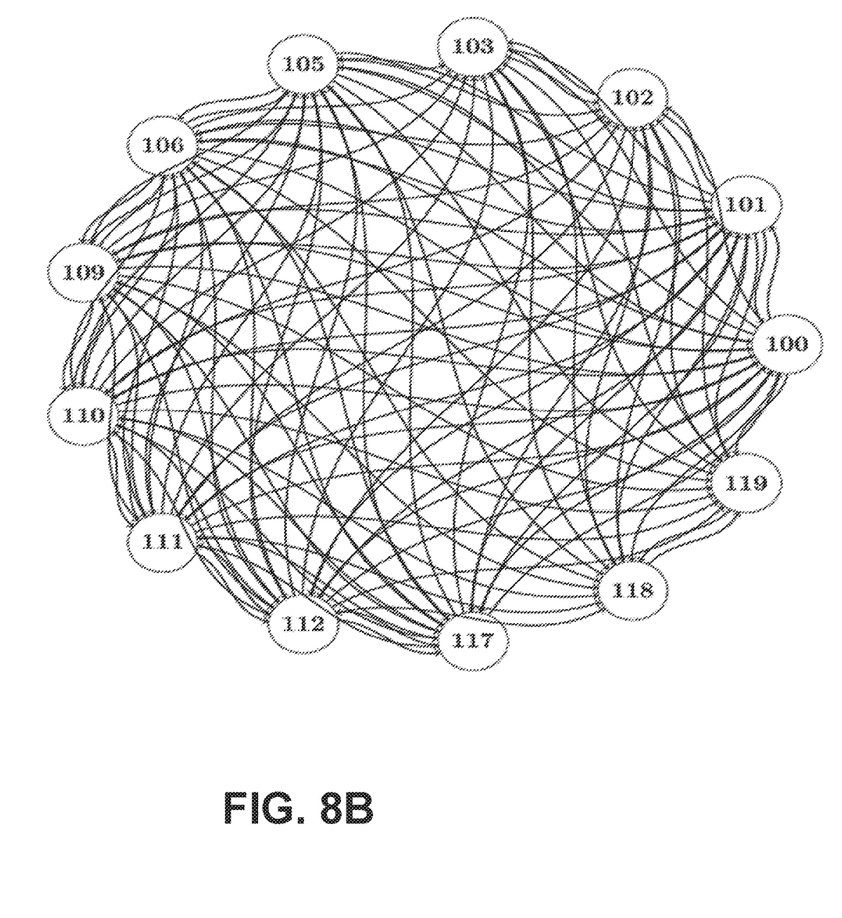

Referring back to processing block 525 in FIG. 5, jobs having the same starting and ending media length pair values (e.g. all associated edges between the vertices are zero-edges) are combined. In one embodiment, combining print jobs sets the printing sequence order for the subject print jobs to be consecutive. At processing block 530, jobs (e.g., vertices) having one zero-edge (e.g., that do not require media transition) between the jobs (e.g., vertices) where at least one of the jobs has the same starting and ending media length values (e.g., the starting and ending media length values of one job are equal) are combined in the sequence corresponding to the zero-edge. FIG. 7B illustrates one embodiment of the organized print jobs in response to performing processing blocks 525 and 530. The arrows shown in FIG. 7B indicate the combining of print jobs, but not necessarily a print order. As shown in FIG. 7B, jobs with the same start and end media can be placed at the beginning or end of jobs that have different start and end media. In this example, printing job 107 immediately after job 105 in 100% of cases will never increase the total number of transitions FIG. 7C illustrates one embodiment of the organized print jobs after the combining, in which the total number of jobs have been reduced to 13 in response to the combining of seven jobs. Additionally, the updated print job list can be treated the same as the initial job list since the transitions were unaffected by the combinations. FIG. 8B illustrates one embodiment of a job relation graph for the combined jobs by the combining of corresponding vertices. As shown in FIG. 8B, the total number of vertices can be reduced by seven since seven jobs were removed from the job list and combined with other jobs. Removing seven vertices means all connections to the previous vertices can be removed. After removing these vertices and their connections, the total edges are reduced to 118. Which is a 69% reduction in the number of edges from the initial graph.

Figure 7D:
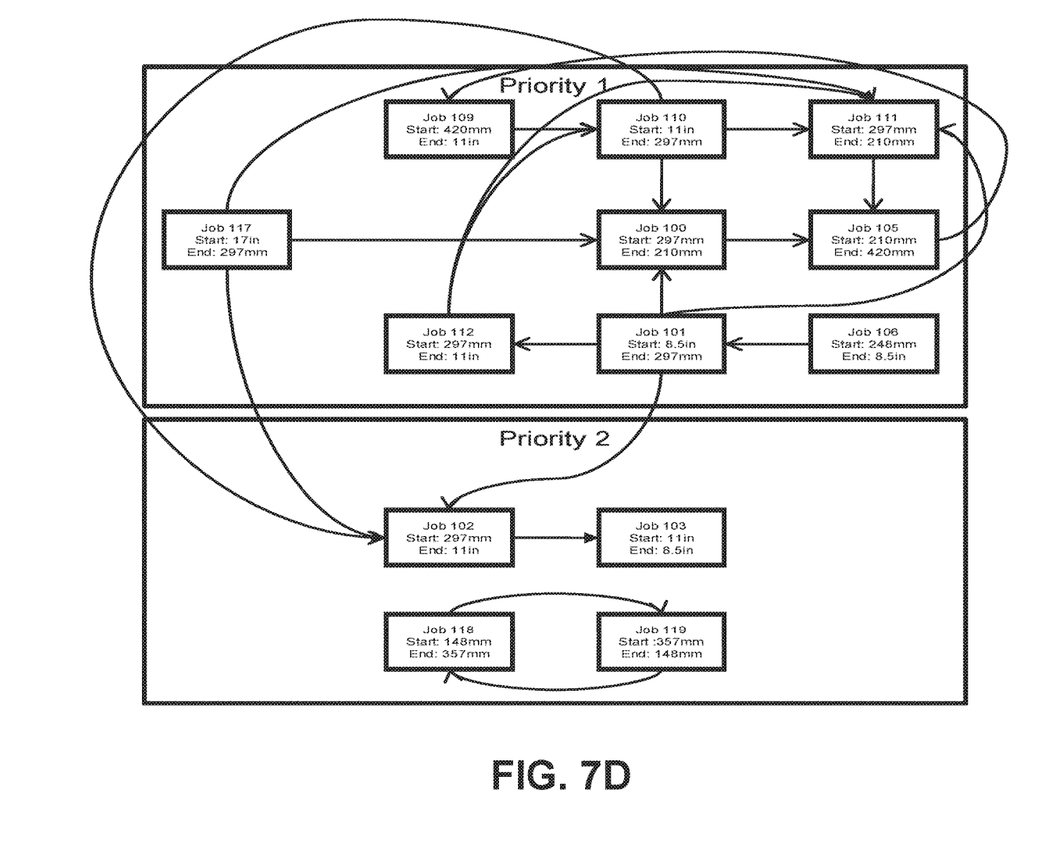
Figure 8C:
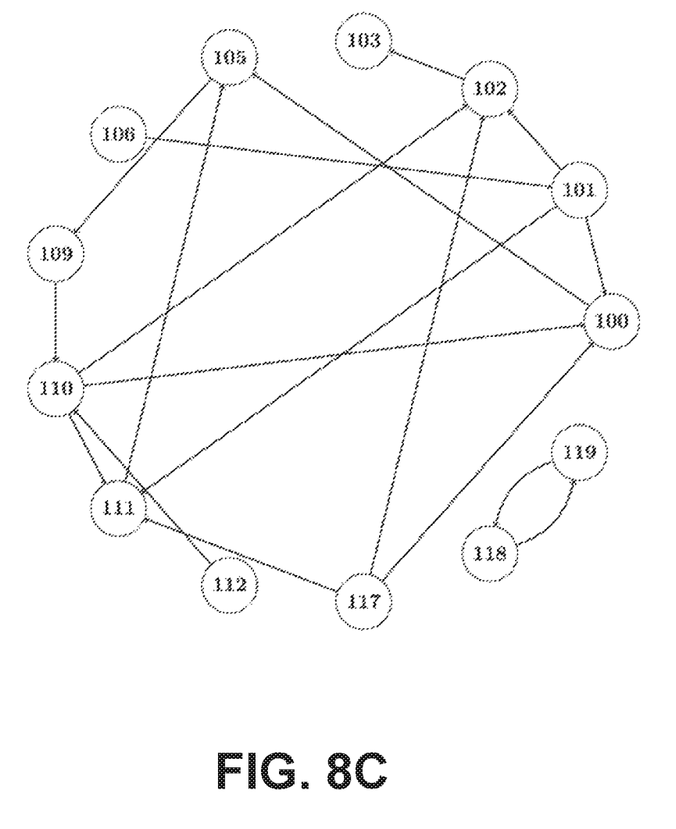

Referring back to processing block 535 in FIG. 5, jobs with one-edges (e.g., require media transitions) are removed. Since the objective is to reduce the total problem space, edges that require a media transition are not taken into consideration. FIG. 7D illustrates one embodiment of the organized print jobs in response to removing one-edges. FIG. 8C illustrates one embodiment of a job relation graph after the removal of one-edges. As shown in FIG. 8C, the total problem space has been reduced because most of the edges in the previous graphs require media transitions. Thus, the resulting graph includes only eighteen edges, which is a 95% reduction in the number of edges from the initial complete graph.

Referring back to processing block 540 in FIG. 5, the final graph is analyzed to determine a set of reduced media length transition paths (e.g., an ordering of the print jobs that minimizes the total number of media transitions). At decision block 545, a determination is made as to whether the set of reduced media length transition paths is greater than a predetermined threshold. If so, a determination is made as to whether the number of transitions in the current set of reduced media length transition paths is equal to the number of transitions in the previous set of reduced media length transition paths, decision block 548.

If the number of transitions in the current set of reduced media length transition paths is not equal to the number of transitions in the previous set of reduced media length transition paths, control is returned to processing block 540 where the final graph is analyzed to determine another set of reduced media length transition paths. If the number of transitions are determined to be equal, or at decision block 545 there is a determination that the set of reduced media length transition paths is less than the predetermined threshold, a revised print job order list is generated based on the set of reduced media transition paths, processing block 550.

Although described above with reference to a print controller, the order optimization process may be featured in other implementations. For instance, some embodiments may feature the order optimization mechanism implemented within a printer, such as printer 160. In yet another embodiment, the order optimization process may be implemented within a cloud computing environment. In such an embodiment, the order optimization mechanism may operate as a web services application to perform print job order optimization. The cloud services application may receive the batch of print jobs and/or print job list from a client device, generate a print job order list meeting a media length transition requirement and transmit the print job order list and/or batch of print jobs back to the client device.

Figure 9:
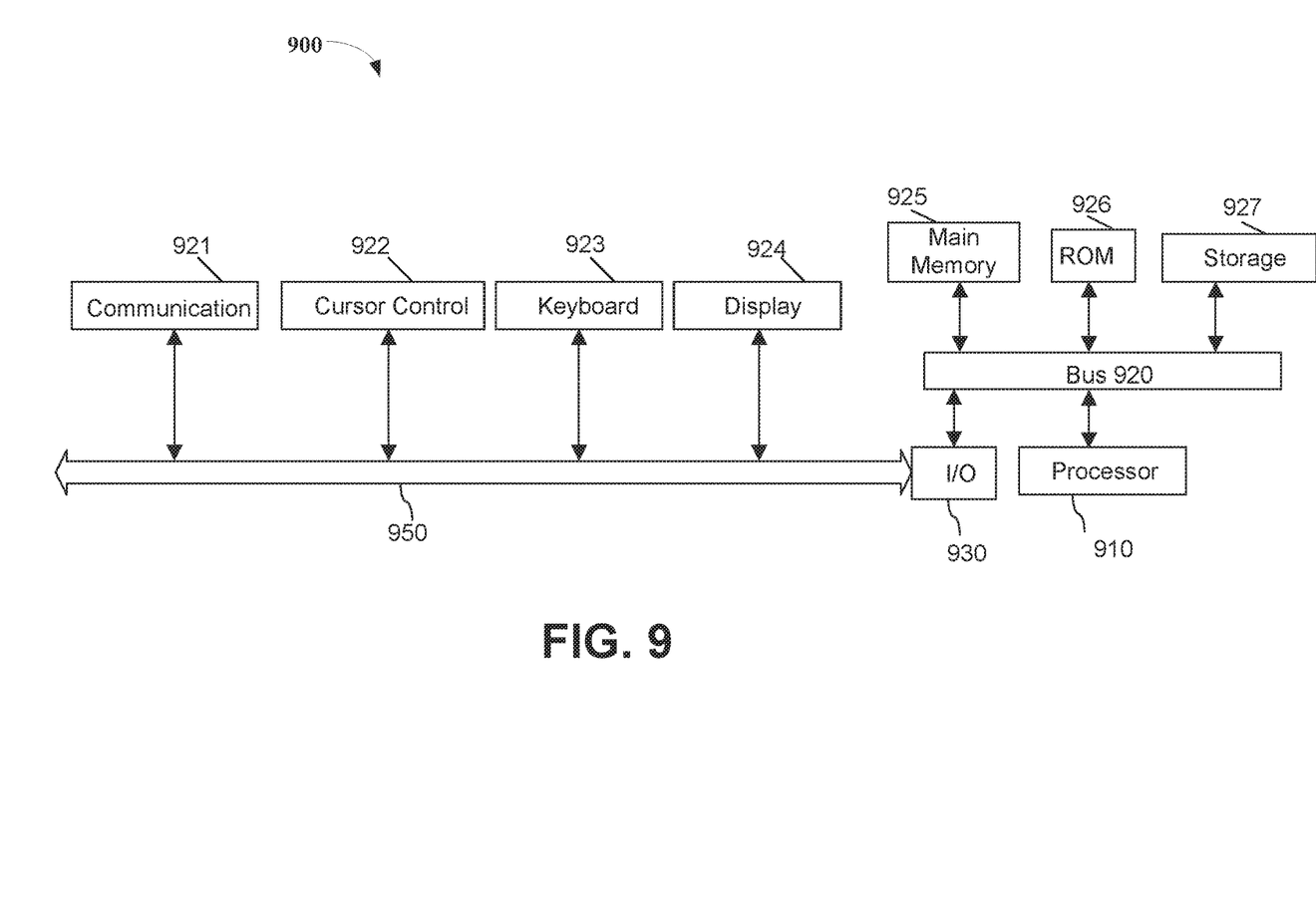
FIG. 9 illustrates one embodiment of a computer system.

FIG. 9 illustrates a computer system 900 on which printing system 130 and/or print controller 140 and/or optimization module 220 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. At least one non-transitory computer readable medium having instructions stored thereon, which when executed by one or more processors, cause the processors to:
    receive a print job batch including a plurality of print jobs each having starting and ending media length pair values; and
    generate a revised print job order list having a sequence for printing the plurality of print jobs to reduce a number of media length transitions based on a matching of the corresponding starting and ending media length pair values of the plurality of print jobs.

2. The computer readable medium of claim 1, wherein generating the revised print job order list comprises:
    generating a directed graph to provide a representation indicating a printing order relationship between each of the plurality of print jobs in the print job batch; and
    generating the revised print job order list based on an analysis of the directed graph.

3. The computer readable medium of claim 2, wherein the directed graph comprises a plurality of vertices corresponding to the plurality of print jobs, each vertex having the corresponding starting and ending media length pair values, and edges between the vertices representing a corresponding sequence for printing each of the plurality of print jobs.

4. The computer readable medium of claim 3, wherein the print job batch further comprises print job prioritization data indicating a priority in which the plurality of jobs are to be printed.

5. The computer readable medium of claim 4, wherein generating the revised print job order list further comprises grouping the plurality of print jobs based on the priority indicated in the print job prioritization data to reduce a number of edges in the directed graph.

6. The computer readable medium of claim 3, wherein generating the revised print job order list further comprises combining a first vertex having a starting and an ending media length value equal to a first value with a second vertex having at least one of a starting and an ending media length value equal to the first value to generate an updated directed graph having combined print job vertices.

7. The computer readable medium of claim 6, wherein generating the print job order list further comprises removing each edge from the updated directed graph that indicates a media transition between the combined print job vertices.

8. The computer readable medium of claim 7, wherein generating the print job order list further comprises determining a first set of one or more reduced media length transition paths that cover the combined print job vertices in the updated directed graph.

9. The computer readable medium of claim 8, wherein generating the print job order list further comprises:
    determining if the first set of one or more reduced media length transition paths is greater than a predetermined transition threshold; and
    determining a second set of one or more reduced media length transition paths that cover the combined print job vertices in the updated directed graph upon a determination that the number of media length transitions in the updated directed graph is greater than the predetermined transition threshold.

10. The computer readable medium of claim 2, wherein generating the print job order list further comprises:
    determining whether a number of media length transitions in the plurality of print jobs in the print job batch is greater than a predetermined transition threshold; and
    generating the directed graph on a determination that the number of media length transitions in the plurality of print jobs is greater than a predetermined transition threshold.

11. A printing system comprising:
    at least one memory device to store optimization logic; and one or more processors, coupled to the at least one memory device, to execute the optimization logic to receive a print job batch including a plurality of print jobs each having starting and ending media length pair values and generate a revised print job order list having a sequence for printing the plurality of print jobs to reduce a number of media length transitions based on a matching of the corresponding starting and ending media length pair values of the plurality of print jobs.

12. The printing system of claim 11, wherein the optimization logic generating the revised print job order list comprises generating a directed graph to provide a representation indicating a printing order relationship between each of the plurality of print jobs in the print job batch and generating the revised print job order list based on an analysis of the directed graph.

13. The printing system of claim 12, wherein the directed graph comprises a plurality of vertices corresponding to the plurality of print jobs, each vertex having the corresponding starting and ending media length pair values, and edges between the vertices representing a corresponding sequence for printing each of the plurality of print jobs.

14. The printing system of claim 13, wherein the print job batch further comprises print job prioritization data indicating a priority in which the plurality of print jobs are to be printed.

15. The printing system of claim 14, wherein the optimization logic generating the revised print job order list further comprises grouping the plurality of print jobs based on the priority indicated in the print job prioritization data to reduce a number of edges in the directed graph.

16. The printing system of claim 13, wherein the optimization logic generating the revised print job order list further comprises combining a first vertex having a starting and an ending media length value equal to a first value with a second vertex having at least one of a starting and an ending media length value equal to the first value to generate an updated directed graph having combined print job vertices.

17. The printing system of claim 16, wherein generating the print job order list further comprises removing each edge from the updated directed graph that indicates a media transition between the combined print job vertices.

18. The printing system of claim 17, wherein the optimization logic generating the print job order list further comprises determining a first set of one or more reduced media length transition paths that cover the combined print job vertices in the updated directed graph.

19. The printing system of claim 18, wherein the optimization logic generating the print job order list further comprises:
   determining if the first set of one or more reduced media length transition paths is greater than a predetermined transition threshold; and
   determining a second set of one or more reduced media length transition paths that cover the combined print job vertices in the updated directed graph upon a determination that the number of media length transitions in the updated directed graph is greater than the predetermined transition threshold.

20. The printing system of claim 12, wherein generating the print job order list further comprises determining whether a number of media length transitions in the plurality of print jobs in the print job batch is greater than a predetermined transition threshold and generating the directed graph on a determination that the number of media length transitions in the plurality of print jobs is greater than a predetermined transition threshold.

* * * * *